United States Patent [19]
Butler

[11] Patent Number: 5,365,970
[45] Date of Patent: Nov. 22, 1994

[54] GRAVITY FLOW CHEMIGATION SYSTEM AND LOW LEVEL SHUTOFF VALVE

[76] Inventor: Larry D. Butler, 25503 Simplot Blvd., Wilder, Id. 83676

[21] Appl. No.: 45,032

[22] Filed: Apr. 7, 1993

[51] Int. Cl.$^5$ .................. F16K 31/22; F16K 33/00
[52] U.S. Cl. ................... 137/192; 137/399; 137/423; 137/435; 137/456; 405/39
[58] Field of Search .......... 137/192, 202, 398, 399, 137/423, 430, 433, 456, 194, 397; 405/39, 40, 41; 222/51, 64, 66, 67, 69

[56] References Cited

U.S. PATENT DOCUMENTS

| | | | |
|---|---|---|---|
| 2,103,057 | 12/1937 | Blumer | 137/399 |
| 2,362,747 | 11/1944 | Duke | 405/41 |
| 2,582,819 | 1/1952 | Daily | 137/192 |
| 3,203,245 | 8/1965 | Smallpiece | 137/192 |
| 4,051,030 | 9/1977 | Huiet, Jr. | 137/399 |
| 4,057,076 | 11/1977 | Varis et al. | 137/423 |
| 4,193,417 | 3/1980 | Bowman | 137/192 |
| 4,640,304 | 2/1987 | Looney | 137/202 |
| 4,715,345 | 12/1987 | Reames, Jr. | 137/399 |

OTHER PUBLICATIONS

Letter from the State of Idaho Department of Agriculture, see pp. 2 and 3.

*Primary Examiner*—George L. Walton
*Attorney, Agent, or Firm*—Frank J. Dykas; Craig M. Korfanta

[57] ABSTRACT

A gravity flow chemigation system (10) is disclosed which generally consists of chemical supply tank (37), in which chemical (29) is contained, a supply line (37) connected to the bottom of chemical supply tank (36), and a low-level shutoff valve (11) suspended across an irrigation ditch (39) and partially below the surface of irrigation water (38). Chemical enters the valve (11) from supply line (37) through air vent tube (21) and inlet (18). The chemical (29) within supply line (37) will continue to flow through valve (11), out outlet (15) and through outlet screen (28) to mix with irrigation water (38) as long as the level of irrigation water (38) remains at a level above converging valve seat (16) of lower float valve (13). Once the level of irrigation water (38) falls below valve seat (16), lower float (17) will engage the lower converging valve seat (16) and close off the valve which will not reactivate until manually reset, even if the irrigation water level rises.

24 Claims, 7 Drawing Sheets

GRAVITY FLOW CHEMIGATION SYSTEM AND LOW LEVEL SHUTOFF VALVE

BACKGROUND OF THE INVENTION

1. Technical Field

This invention generally relates to control mechanisms for gravity flow irrigation systems and more particularly, this invention relates to a one-shot irrigation valve which is normally open in the presence of irrigation water, but which will close in response to an absence of water and remain closed even after a renewed presence of water.

2. Background Art

Recently, the State of Idaho Department of Agriculture implemented regulations which require fertigators and chemigators to employ a "positive shut off valve" in any chemigation employing surface irrigation, an open ditch and a fertilizer gravity flow tank. At the time of the implementation of the regulation and up until the date of the present invention, there was no such device. The State of Idaho delayed the enforcement of the regulation and encouraged development of a device which would satisfy the following criteria:

1. After installation, the positive shutoff valve would be open when the ditch is full.

2. If there is a loss of flow in the ditch, the shutoff valve would close interrupting the flow from the fertilizer tank.

3. If the ditch flow stops and then resumes, the positive shutoff valve stays closed. If siphon tubes are used, the siphon tubes would need to be reset before the nutrient flow could continue. The shutoff valve would stay closed until the siphon tubes are reset preventing fertilizer from passing down the ditch to an off target area potentially resulting in an environmental hazard. After the irrigation system is ready to receive fertilizer, the shutoff valve can be reset.

4. This valve must be corrosion resistant and function with fertilizers which are corrosive products.

DISCLOSURE OF INVENTION

Accordingly, this invention satisfies the foregoing criteria by utilizing a float valve within tubular casing, whereby the float is designed to have a density slightly less than that of the lightest chemical to be used and the tubular casing includes a tapered or converging valve seat against which the float will seal in the absence of water. Once the water level in the irrigation ditch falls below the valve seat, incoming chemical, also here referred to as liquid, will not operate to float the valve since relative displacement of the float has decreased due to the lower portion of the float being engaged with the valve seat. Since buoyancy is a function of mass and displacement, the effective buoyancy will be lower until water again comes into contact with the lower portion of the valve. However in the meantime, liquid will continue to accumulate and fill the tubular casing, exerting substantial pressure on the top portion of the float. The tubular casing and exterior liquid levels are designed to result in a head pressure high enough to insure that the float will not dislodge, even when the level of irrigation water in the ditch surpasses the level of the float within the tubular housing.

Additional features include: a vent in the upper portion of the tubular housing which will vent air but will not allow liquid to pass; an indicator flag to indicate that a low level condition has occurred and that the valve is in a shutoff state; and a manual reset device for either dislodging the float or releasing built-up head pressure to return the valve to its normal operating state.

BEST MODE FOR CARRYING OUT INVENTION

Figure 7:
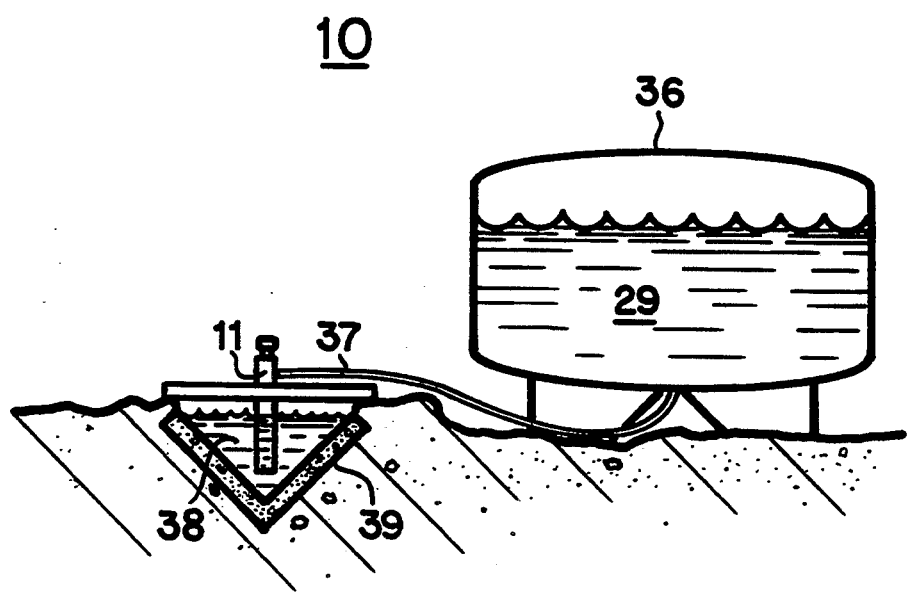
FIG. 7 is a cross sectional schematic view of the chemigation system.

Referring first to FIG. 7, a gravity flow chemigation system 10 is shown in schematic cross section. For the purposes of this application, both "chemigation" and "fertigation" refer to the practice of disbursing chemicals and fertilizer during the irrigation process. Here, gravity flow chemigation system 10 consists of chemical supply tank 36 in which chemical 29 is contained, a supply line 37 connected to the bottom of chemical supply tank 36, and a low-level shutoff valve 11 suspended across an irrigation ditch, or channel, 39 and partially below the surface of irrigation water 38. Various features of the invention will be illustrated with reference to particular embodiments of the invention, however, it should be noted that the features are interchangeable from embodiment to embodiment to render various combinations.

Figure 1:
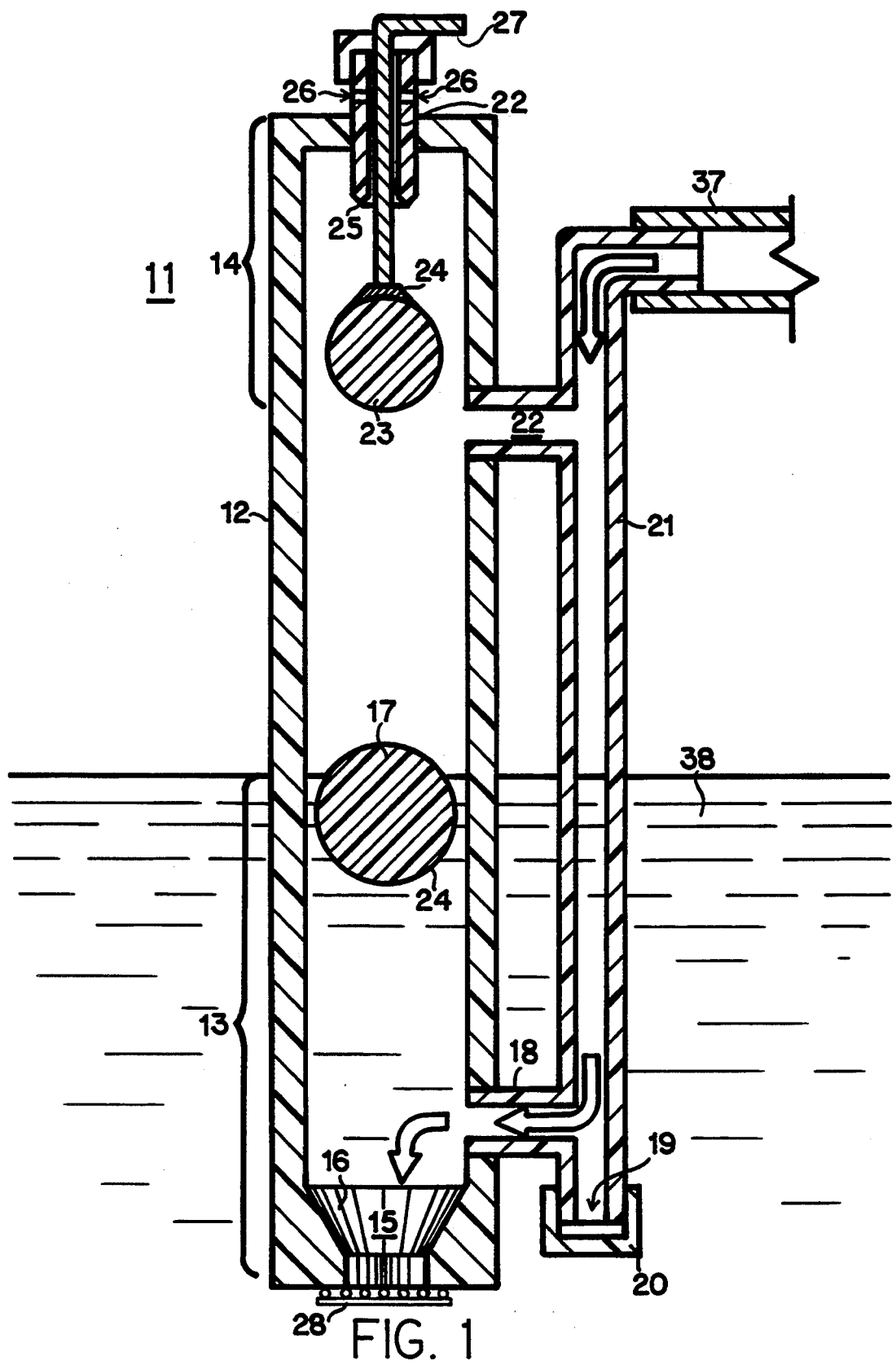
FIG. 1 is a cross sectional view of a first embodiment of the low level shutoff valve in its normal operating state.
Figure 2:
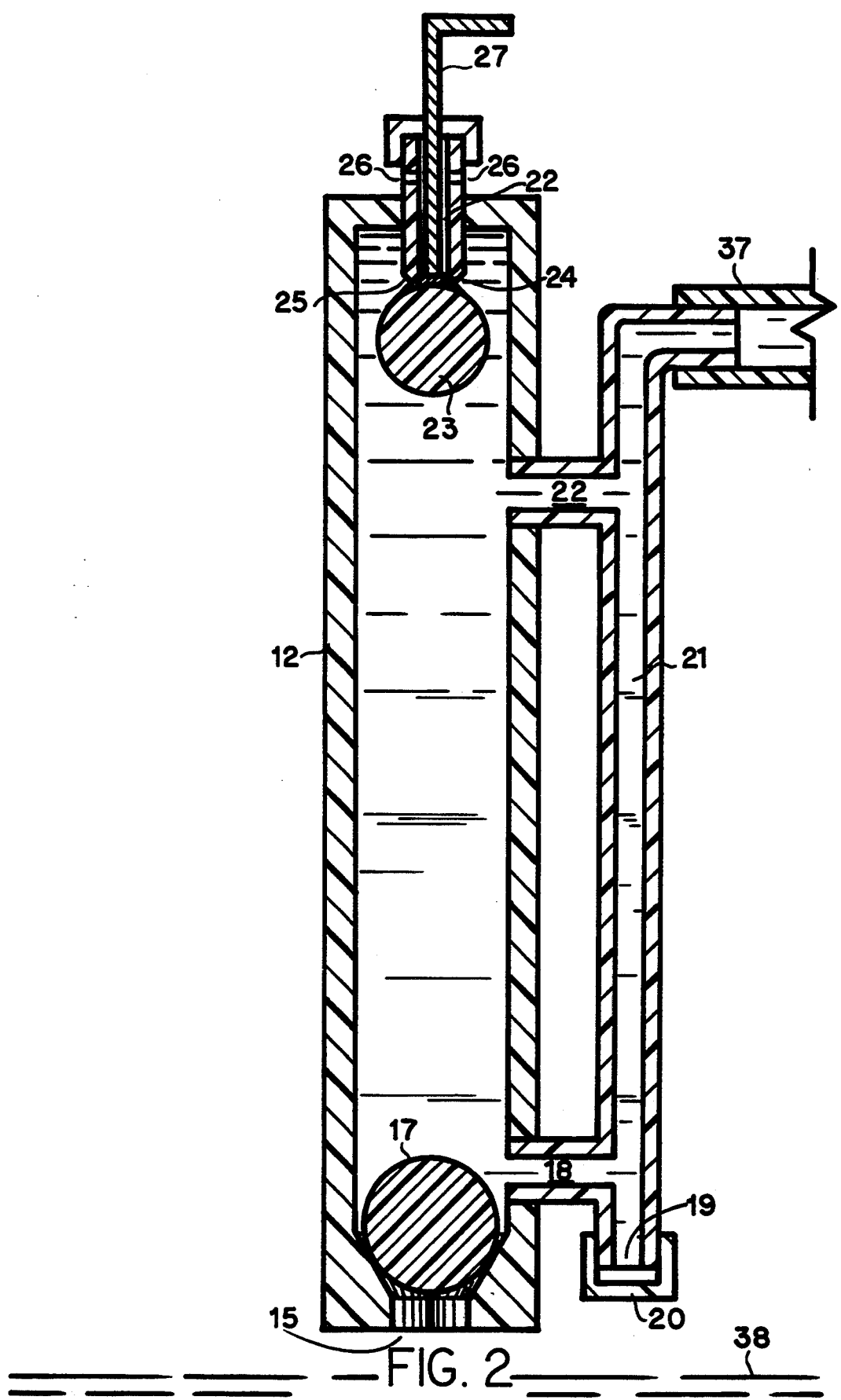
FIG. 2 is a cross sectional view of the first embodiment of the low level shutoff valve showing a low level condition.
Figure 3:
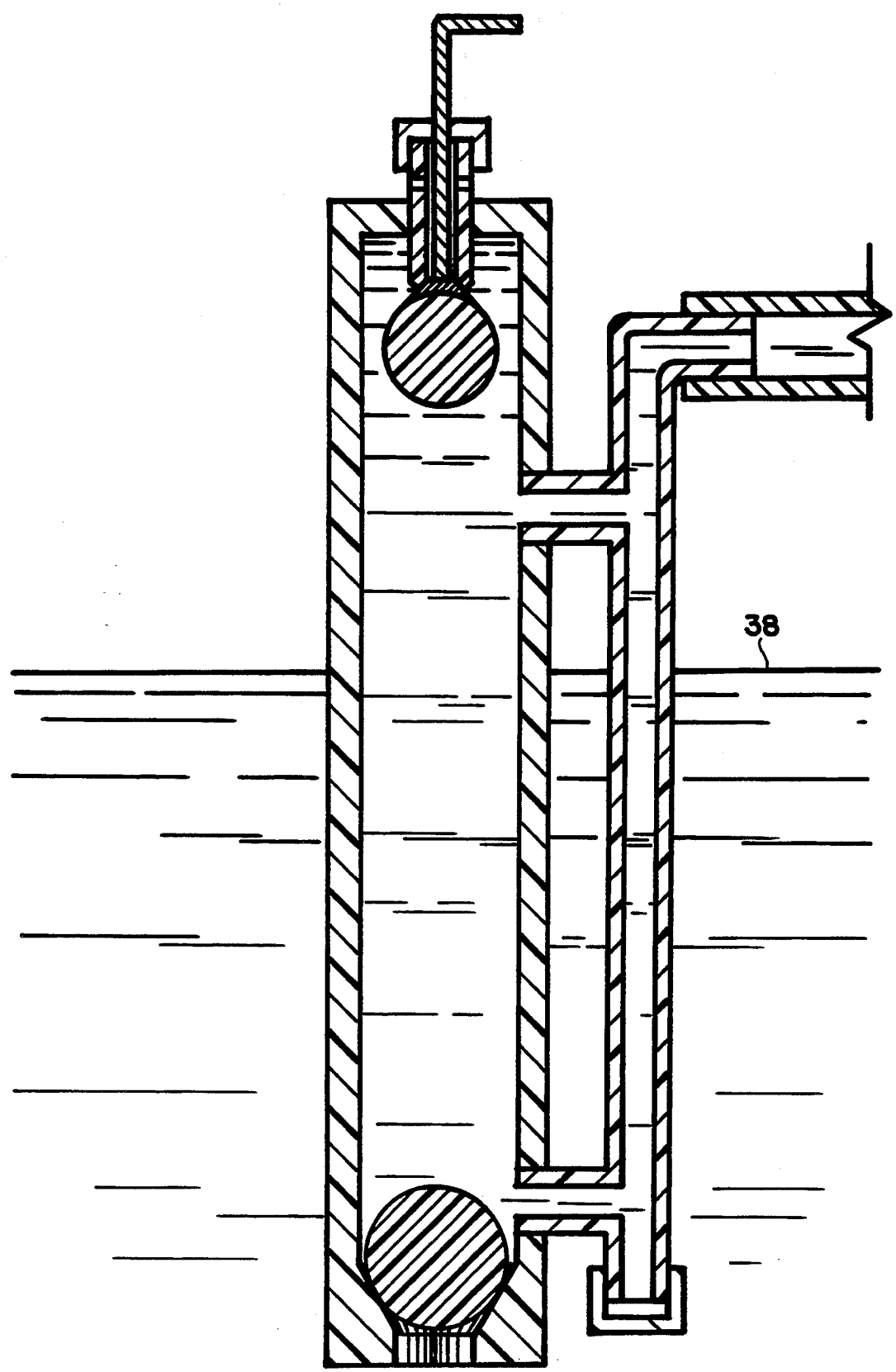
FIG. 3 is a cross sectional view of the first embodiment of the low level shutoff valve showing a closed valve even after the reappearance of irrigation water.

Referring now also to FIGS. 1 through 3, a first embodiment of low level shutoff valve 11 is shown. FIG. 1 illustrates the invention in its normally open operating mode in which chemical enters the valve from supply line 37 through air vent tube 21 and inlet 18. The upper portion of air vent tube 21 is connected to the upper portion of tubular casing 12 to form a first air vent port 22. This configuration permits any air trapped within supply line 37 to exit air vent tube 21, flow through tubular casing 12, through a second air vent port 22 at the top end of valve 11 and out air vent holes 26.

The chemical within supply line 37 will continue to flow through valve 11, out outlet 15 and through outlet screen 28 to mix with irrigation water 38 as long as the level of irrigation water 38 remains at a level above converging valve seat 16 of lower float valve 13.

FIG. 2 shows valve 11 in a shutoff condition where the level of irrigation water 38 has fallen well below the lower valve seat 16. Once the level of irrigation water 38 falls below this point, lower float 17, here shaped as a spherical ball, will engage the lower converging valve seat 16, here shaped as an inverted frustro-conical section. It should be noted that the exact shape of lower float 17 is not critical, as long as the float provides a seating surface 24 which will seal against valve seat 16 and will position a portion of the float's mass out of fluid displacement within tubular housing 12 to lower the effective buoyancy of the float. Likewise, valve seat 16 could take on different configurations within these same constraints.

Once float 17 forms a liquid seal with valve seat 16, the liquid from supply line 37 will quickly accumulate within tubular casing 12 and vent tube 21. Once the level of liquid reaches upper float valve 14, the seating surface 24 of upper float ball 23 will engage the upper valve seat 25, pushing indicator rod 27 up through the top of tubular casing 21, as is shown in FIGS. 2 and 3. Advantageously, indicator rod 27 is painted a bright color, so that a quick, visual inspection would indicate that the valve is in a closed state. At this point, the pressure on the upper surface of lower float 17, which is a function of the column height of the liquid with respect to the level chemical supply tank 37, is sufficient to insure that float 17 will not dislodge, even in the renewed presence of irrigation water 38, as is shown in FIG. 3. This is the so-called "one-shot" feature of the valve whereby the valve will not re-activate once it has been shutoff, at least until it has been manually reset. Once the irrigator has made any necessary adjustments to the irrigation system 10, low level shutoff valve 11 can be reset by removing bleed port cap 20 and allowing the built-up head pressure within valve 11 to be released through bleed port 19.

Figure 4:
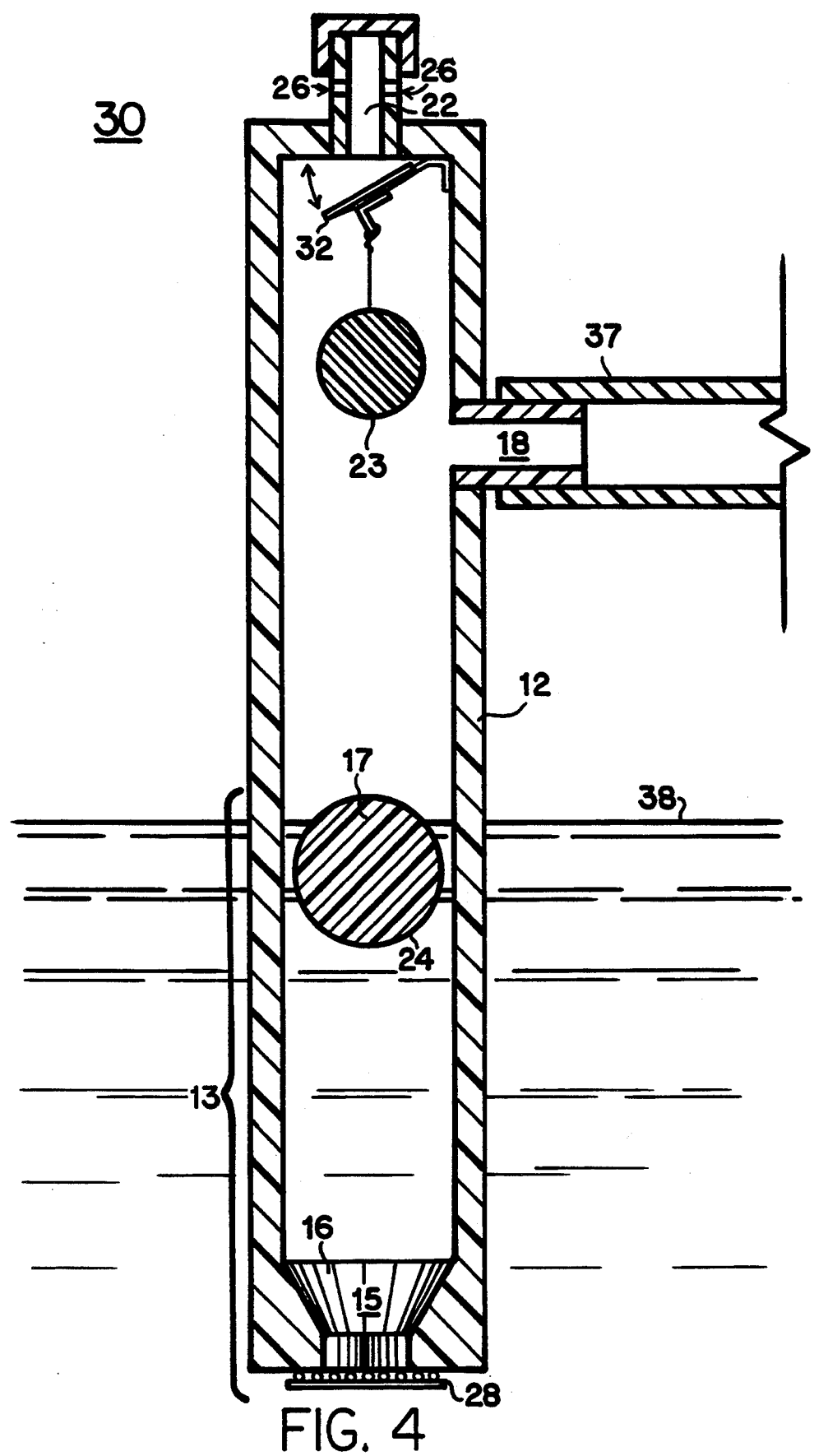
FIG. 4 is a cross sectional view of a second embodiment of the low level shutoff valve in its normal operating state.

Referring now to FIG. 4, a second embodiment of the low level shutoff valve is shown and is here designated as 30. The primary distinction between the first and second 10 embodiments is the substitution of a flapper valve 32 for float valve 14. Here the upper float 23 causes flapper 32 to seal against the top surface of tubular casing 12 to close off upper air vent port 22 and air vent holes 26.

Figure 5:
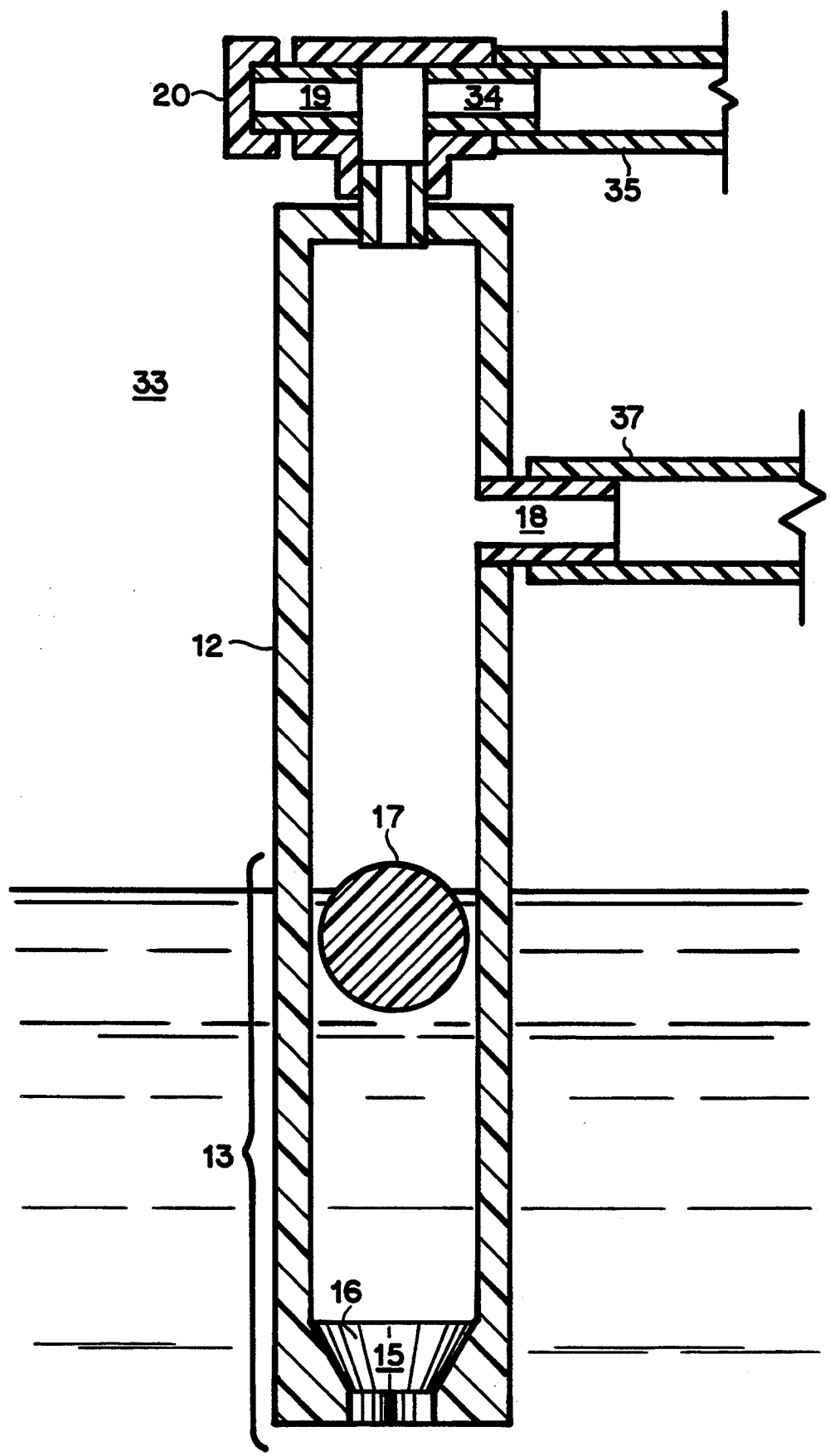
FIG. 5 is a cross sectional view of a third embodiment of the low level shutoff valve in its normal operating state.

Referring now also to FIG. 5, a third embodiment of the low level shutoff valve is shown and designated as 33. Here, rather than using an upper air vent port 22 which vents to the outside, an air return port 34 is provided which is connected to an air return line 35, which in turn has its other end connected to the top of chemical supply tank 36 to vent the air back into tank 36.

Figure 6:
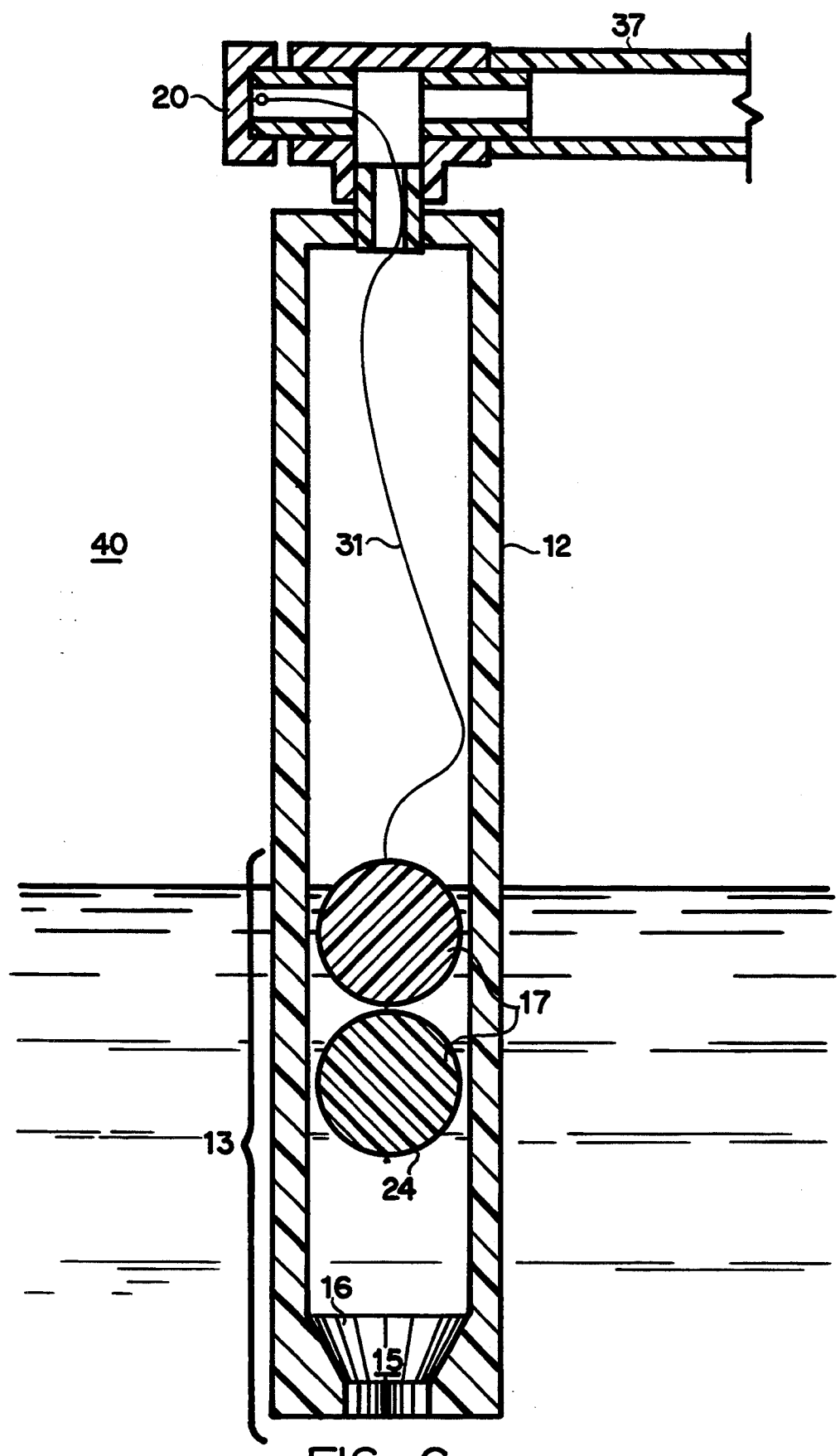
FIG. 6 is a cross sectional view of a fourth embodiment of the low level shutoff valve in its normal operating state.

Referring now to FIG. 6, a fourth embodiment of the low level shutoff valve is illustrated and designated as 40. Here no venting means is provided to allow entrapped air to escape.

Additional features which are illustrated in this embodiment, but are not particular to it, include the use of a tether 31 between float 17 and bleed cap 20 and the use of a lower float 17 consisting of a pair of balls attached one on top of the other. The purpose of tether 31 is to provide a means for manually dislodging lower float 17 from lower valve seat 16 to reset the valve. The tether arrangement can be easily adapted to both the second and third embodiments, the third by providing a T-shaped inlet similar to that shown in the second and fourth embodiments. The purpose of the double ball configuration is to insure that seating surface 24 always remains oriented to properly engage valve seat 16.

The inventor has successfully reduced all four embodiments to practice using standard PVC pipe and pipe fittings. Additionally, the inventor has found that the toy rubber ball similar to those sold under the trade name "SUPER BALL" works well for the purposes of the present invention, since it has an approximate specific gravity of 0.85, which is slightly less than that of AGUA TM, which is the lightest chemical currently used in chemigation.

In use, the irrigator simply installs low level shutoff valve 11 by placing the lower portion of the valve below the level of irrigation water 38 and securing the valve to a cross member, such as a 2"×4" board. Supply line 37 is then connected between inlet 18 and chemical supply tank 36.

While there is shown and described the present preferred embodiment of the invention, it is to be distinctly understood that this invention is not limited thereto but may be variously embodied to practice within the scope of the following claims.

I claim:

1. A chemigation system comprising:
   an irrigation channel;
   a chemical supply tank;
   a chemical supply line having a first end connected to the tank;
   a one-shot water operated valve means being connected to a second end of the supply line and in fluid communication with the chemical supply tank, the valve means being partially submerged in an irrigation water supply and having a float valve responsive to, and open in, the presence of irrigation water within said channel;
   the float valve further being responsive to, and closed in, an absence of irrigation water within said channel; and
   the float valve includes a buoyant valve member having a specific gravity less than that of water and any fluid within the one-shot water operated valve means, the buoyant valve member being configured to have a portion of its surface area positioned out of fluid contact with any fluid within the one-shot water operated valve means in the absence of irrigation water within said channel to thereby reduce the fluid displacement of the valve member and seal the valve closed allowing an accumulation of fluid and a build-up of fluid pressure from said chemical supply tank within the one-shot water operated valve means to keep the valve means closed even in renewed presence of irrigation water in said irrigation channel.

2. The chemigation system of claim 1 wherein the valve means further comprises:
   a tubular casing having an upper end, a lower end, an outlet at the lower end and an inlet located at a point above the lower end;
   a converging valve seat located within the tubular housing at a point directly above the outlet; and
   the buoyant valve member being movably positioned within the tubular housing and having a seating surface positioned thereon configured to frictionally engage the converging valve seat and form a liquid tight seal.

3. The chemigation system of claim 2 wherein the buoyant valve member is spherical in shape and the converging valve seat is conical in shape.

4. The chemigation system of claim 3 further comprising vent means for expelling trapped air from the supply line.

5. The chemigation system of claim 4 further comprising manual valve reset means for releasing fluid pressure within the valve means after an absence of irrigation water, followed by a renewed presence of irrigation water within said channel.

6. The chemigation system of claim 3 further comprising manual valve reset means for releasing fluid pressure within the valve means after an absence of irrigation water, followed by a renewed presence of irrigation water within said channel.

7. The chemigation system of claim 2 further comprising vent means for expelling trapped air from the supply line.

8. The chemigation system of claim 7 further comprising manual valve reset means for releasing fluid pressure within the valve means after an absence of irrigation water, followed by a renewed presence of irrigation water within said channel.

9. The chemigation system of claim 2 further comprising manual valve reset means for releasing fluid pressure within the valve means after an absence of irrigation water, followed by a renewed presence of irrigation water within said channel.

10. The chemigation system of claim 1 further comprising vent means for expelling trapped air from the supply line.

11. The chemigation system of claim 10 further comprising manual valve reset means for releasing fluid pressure within the valve means after an absence of irrigation water, followed by a renewed presence of irrigation water within said channel.

12. The chemigation system of claim 1 further comprising manual valve reset means for releasing fluid pressure within the valve means after an absence of irrigation water, followed by a renewed presence of irrigation water within said channel.

13. A one-shot valve for chemigation comprising:
    casing means being connected to a chemical supply line and in fluid communication with a chemical supply tank, the casing means being partially submerged in an irrigation water supply;
    a float valve being positioned the casing means and responsive to, and open in, the presence of irrigation water within said irrigation water supply;
    the float valve further being responsive to, and closed in, an absence of irrigation water within said irrigation water supply; and
    the one-shot valve includes a buoyant valve member having a specific gravity less than that of water and any fluid within the casing means, the buoyant valve member being configured to have a portion of its surface area positioned out of fluid contact with any fluid within the casing means in the absence of irrigation water to thereby reduce the fluid displacement of the valve member and seal the valve closed allowing an accumulation of fluid and a build-up of fluid pressure from said chemical supply line within the casing means to keep the valve closed even in renewed presence of irrigation water in said irrigation water supply.

14. The valve of claim 13 further comprising:
    the casing means being a tubular casing having an upper end, a lower end, an outlet at the lower end and an inlet located at a point above the lower end;
    a converging valve seat being located within the tubular housing at a point directly above the outlet; and
    the buoyant valve member being movably positioned within the tubular housing and having a seating surface positioned thereon configured to frictionally engage the converging valve seat and form a liquid tight seal.

15. The valve of claim 14 wherein the buoyant valve member is spherical in shape and the converging valve seat is conical in shape.

16. The valve of claim 15 further comprising vent means for expelling trapped air from the supply line.

17. The valve of claim 16 further comprising manual valve reset means for releasing fluid pressure within the casing means after an absence of irrigation water, followed by a renewed presence of irrigation water within said irrigation water supply.

18. The valve of claim 15 further comprising manual valve reset means for releasing fluid pressure within the casing means after an absence of irrigation water, followed by a renewed presence of irrigation water within said irrigation water supply.

19. The valve of claim 14 further comprising vent means for expelling trapped air from the supply line.

20. The valve of claim 19 further comprising manual valve reset means for releasing fluid pressure within the casing means after an absence of irrigation water, followed by a renewed presence of irrigation water within said irrigation water supply.

21. The valve of claim 14 further comprising manual valve reset means for releasing fluid pressure within the casing means after an absence of irrigation water, followed by a renewed presence of irrigation water within said irrigation water supply.

22. The valve of claim 13 further comprising vent means for expelling trapped air from the supply line.

23. The valve of claim 22 further comprising manual valve reset means for releasing fluid pressure within the casing means after an absence of irrigation water, followed by a renewed presence of irrigation water within said irrigation water supply.

24. The valve of claim 13 further comprising manual valve reset means for releasing fluid pressure within the casing means after an absence of irrigation water, followed by a renewed presence of irrigation water within said irrigation water supply.

* * * * *